Feb. 14, 1933.    B. DE MATTIA    1,897,690
TIRE SHAPING AND AIR BAG INSERTING MACHINE
Filed Oct. 1, 1929    4 Sheets-Sheet 1

INVENTOR
Bartoled De Mattia
BY
Morrison Kennedy Campbell
ATTORNEYS

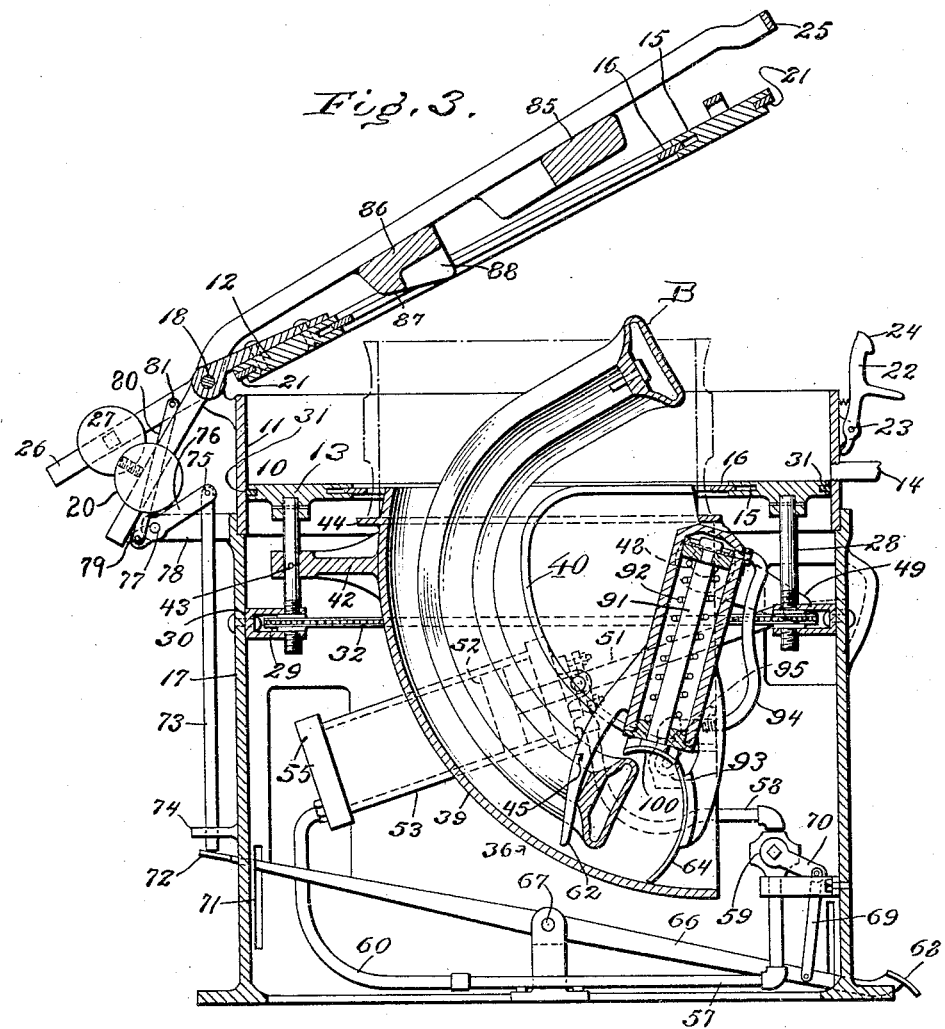

Feb. 14, 1933.  B. DE MATTIA  1,897,690
TIRE SHAPING AND AIR BAG INSERTING MACHINE
Filed Oct. 1, 1929      4 Sheets-Sheet 3
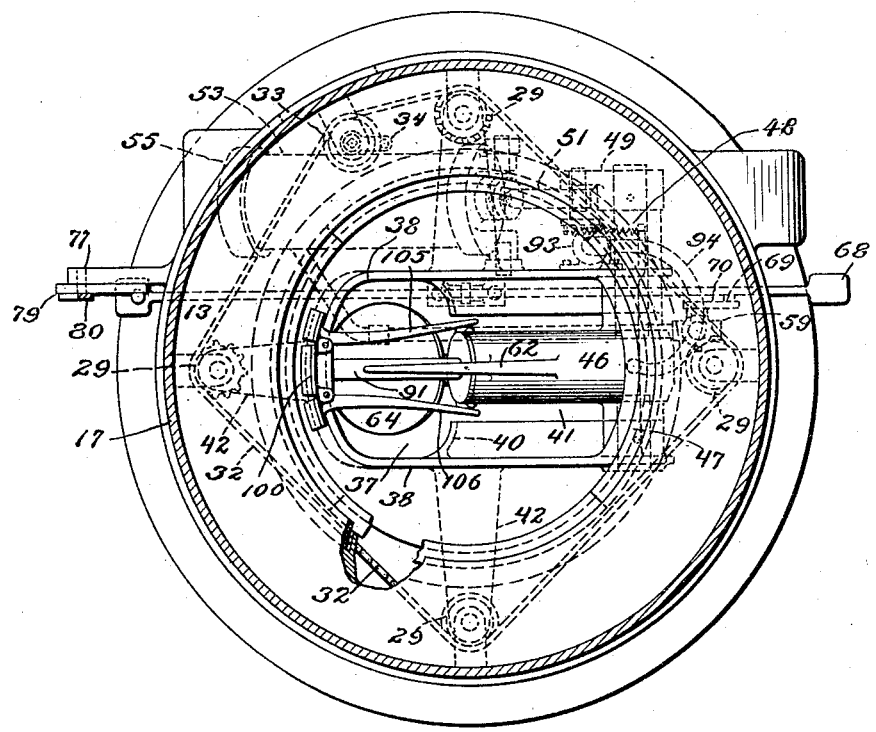
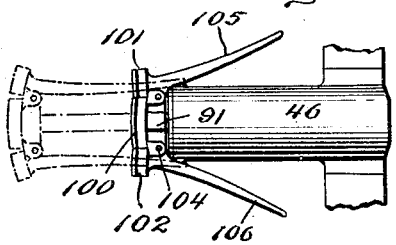
INVENTOR
Bautoed de Mattia
BY
ATTORNEYS Patented Feb. 14, 1933

1,897,690

UNITED STATES PATENT OFFICE

BARTHOLD DE MATTIA, OF PASSAIC, NEW JERSEY, ASSIGNOR TO THE GOODYEAR TIRE & RUBBER COMPANY, A CORPORATION OF OHIO

TIRE SHAPING AND AIR BAG INSERTING MACHINE

Application filed October 1, 1929. Serial No. 396,503.

This invention is directed to an improved machine or apparatus for shaping, by the vacuous method, tires made in pulley-band form and for automatically positioning within the shaped tires air bags, water bags, or similar inflatable formers preparatory to the vulcanization of the tires.

In a co-pending application, Serial No. 389,121, filed August 29, 1929, there is disclosed a new method for inserting an air bag within a shaped tire, and according to this method, the air bag is first elongated sufficiently to give it a width less than (or not substantially greater than) the bead diameter of the tire; then one end of the elongated bag is placed in the tire at some point in its periphery; after which the remainder of the bag is moved gradually (although rapidly) into the tire in an endwise direction, that portion of the bag which enters the tire being allowed (as it enters) progressively to resume its circular shape therein, while the trailing or uninserted portion of the bag is maintained in elongated condition, so as to be kept within the compass of the bead diameter, until it finally enters the tire and is then allowed to return to circular shape within it.

The improved machine, which forms the subject of the present application, has been designed to carry out the new method above described in conjunction with the well-known "vacuum-box" now extensively employed in the art for the shaping of drum-built tires. A typical example of a tire-shaping vacuum-box may be found in U. S. Patent No. 1,507,563, granted to A. O. Abbott, jr., on September 9, 1924.

More specifically, the invention contemplates the provision of an air bag receiving compartment or holder at one side of the tire-shaping vacuum chamber, said holder being of a width less than the bead diameter of the tire. An air bag engaging member in the nature of a fork or hook is movable into and out of said compartment and is adapted on its inward stroke to draw an air bag into the holder to elongate it, and on its outward stroke to push the elongated air bag from said holder into the tire. This air bag engaging member is actuated through the medium of a rocking pressure cylinder, operation of which in one direction is controlled manually, and in the other direction automatically from a portion of the tire shaping means.

In one of the illustrated embodiments of the invention, the air bag holder is curved longitudinally so as to bend the air bag out of its own plane in addition to elongating it, while in another illustrated embodiment the holder is substantially straight throughout its length so as merely to elongate the air bag in its own plane. The operation of the parts, however, is substantially the same in both cases, the principal difference being that in the first form the air bag engaging member moves arcuately, while in the second form it moves rectilinearly.

The vacuum chamber is defined between a pair of spaced annular walls which are relatively adjustable to accommodate tires of different sizes, and to compensate for this adjustment (so that the air bags will always be properly placed regardless of size), the air bag holder is mounted for adjustment along with said adjustable annular wall.

The foregoing and other objects, features, and advantages of the invention will be appreciated from the following description in connection with the accompanying drawings, wherein two forms of the invention are shown by way of illustration, and wherein Fig. 1 is a vertical transverse sectional view through one form of the improved machine;

Fig. 3 is a sectional view similar to Fig. 1 but with the parts in different positions;

Fig. 4 is a horizontal sectional view taken approximately on the line 4—4 of Fig. 1;

Fig. 5 is a detail view of the means for pushing the terminal end portion of the bag into the tire.

Figure 1:
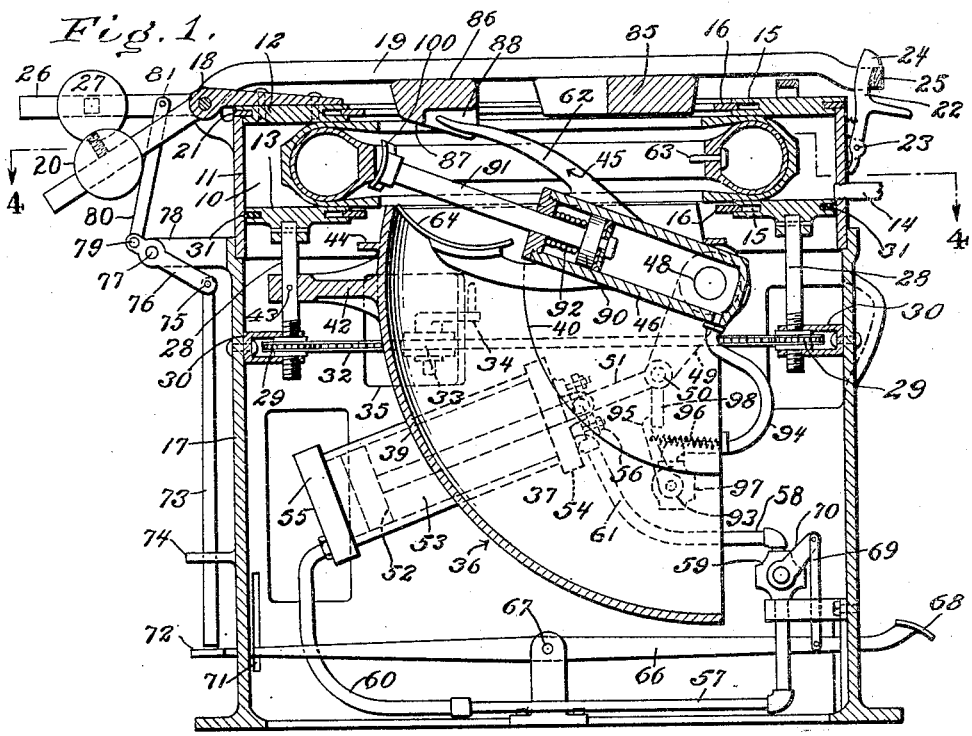
Figure 2:
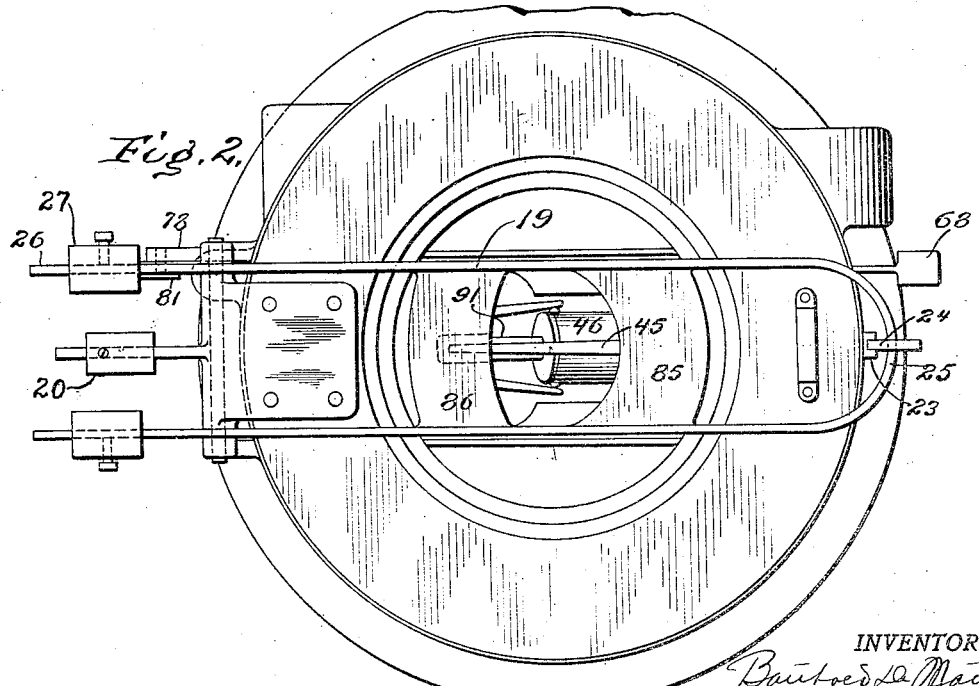
Fig. 2 is a top plan view thereof.

Referring first to Figs. 1 to 5 inclusive, the improved machine comprises an annular vacuum chamber 10 defined between an outer cylindrical wall 11 and spaced annular top and bottom walls 12 and 13, respectively. The chamber 10 is open at its inner periphery and is of such proportions as to impart to a tire carcass a U-shape approximating that of the finished tire. The tire is initially built up in pulley-band form on a drum, as is well known to those skilled in the art, and in this condition (see the dotted line showing in Fig. 3), it is mounted as a closure for the inner periphery of the vacuum chamber 10, from which the air is then exhausted through a pipe 14. As a result of the vacuum thus created in the chamber 10, the tread portion of the tire is drawn radially into the vacuum chamber and the bead portions of the tire are moved closer together (see Fig. 1).

In order sealingly to engage the outer periphery of the pulley-band tire, and thus to prevent leakage of air past the tire into the vacuum chamber, the inner edges of the top and bottom walls 12 and 13 are provided with annular grooves 15 for the reception of ring segments 16, which may be moved radially into and out of sealing relation to the tire, either automatically or manually as desired.

The cylindrical outer wall 11 is supported on or with a casing 17, which forms an enclosure for certain operating mechanism later to be described. The top annular wall 12 is hingedly connected at 18 to the rearward side of the cylindrical wall 11, and a U-shaped member 19, which extends forwardly and diametrically over said cylindrical wall 11 for a purpose to be hereinafter explained, is also pivoted on the same hinge pin at 18 for swinging movement independently of the annular wall 12. Thus, the top wall 12 is capable of being moved away from the walls 11 and 13 to give ready access to the interior of the vacuum chamber 10 in facilitating the removal of the shaped tires with their contained air bags. The underside of the outer edge of the top wall 12 is rabbetted and provided with a gasket 21 which seals the joint between the walls 11 and 12 when the latter is in its closed position, as shown in Fig. 1. To lock the U-shaped member 19 in its operative position when the wall 12 is in closing position, there is employed a spring-pressed latch 22, which is pivoted at 23 to the front of the wall 11 and which has a shoulder 24 adapted to engage over the bent intermediate portion 25 of the U-shaped member 19.

A counterbalance weight 20 is mounted with the annular wall 12 at the rearward side of the hinge 18, to facilitate opening movement of said annular wall and to hold it in its open position.

Also rearwardly of the hinge pin at 18, the member 19 has two extension arms 26, carrying adjustable counterbalance weights 27 which facilitate the upward movement of said member 19. As will be apparent, by releasing the latch 22, the member 19 followed by the top wall 12 may be swung upwardly by hand, the counterbalance weights 20 and 27 effecting a substantial reduction in the manual effort necessary for this operation.

It is desirable to vary the distance between the top and bottom walls 12 and 13 from time to time in order to accommodate tires of different sizes. For this purpose, the bottom wall 13 is axially adjustable, being supported for that purpose by a plurality of posts 28 (here shown as four in number) whose lower ends are screw-threaded for cooperation with internally threaded sprocket wheels 29. These sprocket wheels 29 are rotatably mounted in brackets 30 secured to the interior of the casing 17 and so formed as to prevent axial movement of the sprockets. As a result, rotation of the sprockets will cause the posts 28 to move upwardly or downwardly, as the case may be, and carry the bottom wall 13 with them. In order to prevent leakage of air past the wall 13 and into the vacuum chamber 10, said wall is formed with a peripheral groove for the seating of a packing ring 31 which fits tightly against the inner surface of the cylindrical wall 11.

The sprocket wheels 29 are connected together for rotation in unison by an endless belt or link chain 32, which may be actuated manually by another sprocket wheel 33 rotatable by a hand crank 34 (Figs. 1 and 4). Access to the hand crank 34 is easily obtained through an opening 35 cut through the casing 17 at one side of the machine.

Disposed within the casing 17 and below the plane of the vacuum chamber 10 is another casing 36 which contains an arcuate holder or pocket 37 in which the air bag B is adapted to be placed, said holder presenting a bellmouth receiving opening adjacent to the inner periphery of the bottom wall 13, and being defined (see particularly Figs. 1 and 4) by the side walls 38, 38, and the curved rear wall 39 of the casing, and by an intermediate curved wall or partition 40, the latter being formed with a central longitudinal slot 41 for a purpose to be hereinafter explained. The side walls 38, 38, are spaced apart at a distance considerably less than the bead diameter of the tire to be shaped, so that as the bag B is moved into the holder 37, it will be given a curved elongate shape as best shown in Fig. 3. In the latter figure, the bag is shown as uninflated, but it may be partly inflated if desired, either before, after, or as it is inserted within the tire.

In order to furnish suitable support for the casing 36 and to render it adjustable with the bottom wall 13, said casing is provided with a plurality of outwardly extending arms or brackets 42 respectively secured, as at 43, to the vertically adjustable posts 28. Immediately above said arms or brackets 42, the casing 36 is formed or provided with an annular shelf 44 which constitutes a support for the lower bead of the pulley-band tire, said shelf being preferably spaced below the bottom wall 13 at a distance sufficient to place the median or tread portion of the tire substantially in the center line of the open inner periphery of the vacuum chamber 10.

For the purpose of drawing the bag into the holder 37 and thus elongating it from its normal circular shape, a fork or hook member 45 is mounted for arcuate movement into and out of said holder. This fork or hook member is carried by a rocking arm 46 which is pivoted by stub shafts 47 and 48 and adapted to operate in the slot 41, said stub shafts being journaled in the opposite side walls 38, 38 of the casing 36. The shaft 48 extends outwardly beyond the corresponding side wall 38 and has secured to its outer end an arm 49, which is pivotally connected at 50 to one end of a rearwardly extending piston rod 51. The other end of the piston rod 51 has secured to it a double-acting piston 52 fitted to operate in a rocking cylinder 53 pivotally supported by and at one side of the casing 36. Cylinder heads 54 and 55 form closures for the forward and rearward ends of the cylinder 53, the head 54 having a stuffing box 56 of any suitable construction through which the piston rod 51 slides. Pressure fluid, such as compressed air, is supplied to and exhausted from the opposite ends of the cylinder 53 through pipes 57 and 58 under the control of a four-way cock or valve 59 (as will later be described), said pipes being respectively connected with the cylinder by flexible hose sections 60 and 61 which leave the cylinder free to rock.

In the normal position of rest prior to the commencement of the operating cycle, the hook member 45 is in its uppermost position, with its upper finger or tine 62 extending above the central circumferential plane of the vacuum chamber (see Fig. 1), and the top wall 12 is in its upper or open position as shown in Fig. 3. The bag B need only be thrown into the vacuum box with the portion diametrically opposed to the inflating stem 63 disposed under said tine 62. Then, by admitting pressure fluid through the pipe 57 to the rear or lower end of the cylinder 53, the piston 52 and rod 51 will be driven forwardly and upwardly, rocking the arm 46 and carrying the hook member 45 into the holder 37 (see Fig. 3). In this movement of the hook member, the bag B will be drawn into the holder, and by virtue of the restricted dimensions and shape of the holder, the bag will be given a curved elongated form, with one end projecting from the bell-mouth of the holder, as clearly shown in Fig. 3. Subsequently, when the flow of pressure fluid in the cylinder is reversed and the top wall locked down in its closed position, the hook member 25 will be moved outwardly again, causing the lower finger or tine 64 (which is preferably in the nature of a concave plate) to push the bag out of the holder 37 and into a tire after or as it is shaped in the vacuum chamber 10.

It will now be seen that the elongated bag is placed in the vacuum-shaped tire by an endwise movement, its uppermost end being the first to enter the tire at the front side thereof. Thereafter, with the inserted end of the bag acting as an anchorage, the side portions of the elongated bag are gradually moved up out of the holder and into the tire, where their resiliency and the internal pressure cause them progressively to expand or fill out the tire, that part of the bag which is outside of the tire plane being maintained in elongated form or of contracted width until it enters the tire. As the terminal end portion of the elongated bag moves into the plane of the tire, it may have a slight reverse bend, but this will snap into the tire by the natural resiliency or internal pressure of the bag, or pressure may be applied to it by a pusher, such as will hereinafter be described, to compel the bag to reassume its normal circular shape within the tire.

To admit pressure fluid to the lower end of the cylinder 53 and thus to move the hook member 45 downwardly into the holder 37, the cock or valve 59 is actuated by the depression of a pedal lever 66, which extends in a general fore-and-aft direction through the bottom of the casing 17, wherein it is pivoted at 67 intermediate its ends. The forward end of the lever 66 is provided with a pedal pad 68 placed in a convenient location adjacent the operator's station at the front of the machine. A link 69 connects the lever 66 with a radial arm 70 of the valve 59, said arm 70 being secured as usual to the rotary ported plug of the valve. The rear end of the pedal lever 66 extends through a slot 71 in the casing 17 and is provided with a flattened portion of plate 72, which cooperates with automatic mechanism for reversing the valve 59 and admitting pressure fluid to the upper end of the cylinder 53 for the movement of the hook member 45 upwardly in the holder 37.

This valve reversing mechanism comprises a substantially vertical push rod 73 movable upwardly and downwardly through a guide lug 74 at the back of the casing 17, the lower end of the push rod being disposed immediately above the flattened portion 72 of the foot lever 66, and the upper end of the push rod being pivotally connected at 75 to the front end of a rocking lever 76. This rocking lever 76 is pivotally supported at 77, intermediate its ends, by a suitable bracket 78, and its rear end is pivotally connected at 79 to the lower end of a link 80, whose upper end is connected at 81 to one of the extension arms 26 of the U-shaped member 19.

According to the foregoing arrangement, as the member 19 is swung upwardly to the position shown in Fig. 3, permitting the vacuum box to be opened, the lever 76 is rocked in a counterclockwise direction, raising the push rod 73 to such extent that its lower end is spaced from the flattened portion 72 of the pedal lever 66. Then, as the pedal 68 is depressed to cause the inward movement of the hook member 45 as previously explained, the flattened portion 72 moves up substantially into abutment with the lower end of the push rod 73. Thereafter, when the operator has placed a pulley-band tire in the machine, he closes the box by swinging the top wall 12 downwardly, whereupon the tire will be shaped, and then the member 19 is swung downwardly, in which movement, the link 80 rocks the lever 76 in a clockwise direction, causing the push rod to move downwardly. Since its flattened portion 72 is disposed in the path of movement of the push rod, the lever 66 will be rocked about its pivot 67 and returned to its original position, as in Fig. 1, and, in so doing, will act through the link 69 to reverse the valve 59 and cause the piston 52 to rock the hook member 45 upwardly for pushing the air bag from the holder into the shaped tire.

As the bag B commences to move out of the holder 37 due to the push of the hook member 45, its outer end is guided radially into the shaped tire by virtue of its engagement with the flat under surface of a segmental block 85 carried by the U-shaped member 19 forwardly of the vertical center line of the vacuum box. Another segmental block 86, with an upwardly sloping surface 87, is also carried by the member 19 rearwardly of said center line and is provided with a notch 88 for the reception of the upper tine or finger 62 of the hook member. As the terminal end portion of the bag moves up out of the holder 37, it will come in contact with the inclined surface 87 of the block 86 and be positively guided upwardly and radially into the corresponding portion of the tire.

As previously stated, the terminal end portion of the bag may have a reverse bend in it when it leaves the holder 37, and for this reason it is proposed to positively push this end portion of the bag into the tire, in case the natural resiliency and internal pressure of the bag are not found to be sufficient. To that end, the rocking arm 46, which carries the hook member 45, is made in the form of a cylinder, and slidable within said cylinder, there is a piston 90 having a piston rod 91 extended rearwardly between the tines of the hook member. A compression spring 92 acts against the piston 90 to urge it toward the forward end of the cylinder 46, and at the end of the operating cycle, air under pressure is admitted to said forward end of the cylinder to move the piston rearwardly or upwardly against the action of the spring.

A three-way valve 93 (see particularly Fig. 1), mounted within the casing 17 and at one side of the holder 37, is connected by a flexible hose 94 to the forward end of the cylinder 46. This valve has an actuating arm 95 which, under the influence of a tension spring 96, is normally maintained in closed or exhausting position, so that the cylinder is vented through an outlet 97. The end of the arm 95 is disposed in the path of inward movement of an extension 98 on the arm 49, so that as the piston rod 51 approaches the limit of its rearward movement to force the hook member 45 upwardly, said extension 98 will engage the arm 95 and actuate the valve 93 to admit air to the cylinder 46.

The outer end of the piston rod 91 carries a segmental pusher plate 100 which is adapted to engage the terminal end portion of the bag as it moves into the plane of the tire, and to force the same into place within the tire. This pusher plate 100 is preferably concave in the vertical plane and convex in the horizontal plane so as more evenly to fit the inner periphery of the bag; and in order to increase the engaging surface, two additional segments 101 and 102 are pivotally attached as at 103 and 104 to the opposite ends of the plate 100 (see Fig. 5). Guiding arms 105 and 106 are associated with the additional segments 101 and 102, being arranged to bear against the upper or rear end portion of the cylinder 46 with a cam action.

With this arrangement, the pusher members are adapted to occupy a relatively small space when in the bottom of the holder 37, yet they will fan out when in action and engage a substantial portion of the bag to give it the final push into the tire, automatically conforming to the shape of the engaged portion of the bag and distributing the pressure from the piston rod 91 along diverging lines rather than to concentrate it at one point. In consequence, the bag will be positively and easily returned to its original circular shape in the final operation of the machine. Any number of pivoted segments may be employed, depending upon the particular design of the machine, so that in this respect the invention is not restricted to the use of only two segments.

Assuming the vacuum box to be opened, the operation of the machine is as follows:

First, the attendant turns the hand crank 34 to either raise or lower the bottom annular wall 13 of the vacuum chamber so as to adjust it to accommodate the desired width of tire pulley-band to be shaped.

He then places an air bag in the vacuum box with its rear portion disposed between the tines 62 and 64 of the hook member 45 (the latter occupying its raised position at the time), whereupon the pedal 68 is depressed to rock the lever 66 and actuate the valve 59 to admit compressed air to the lower or rearward end of the cylinder 53. This causes the piston 52 and piston rod 51 to move upwardly and forwardly and, through the arm 49 and rocking cylinder 46, to swing the hook member 45 downwardly and draw the bag into the holder 37, thereby distorting it from its normal circular shape into the desired curved elongate shape (see Fig. 3).

A tire pulley-band is then placed in the machine with its lowermost bead resting upon the annular shelf 44 (see the dotted line showing in Fig. 3), after which the operator swings the top wall 12 down to closed position, and at the same time opens a valve (not shown) to connect the pipe 14 to a vacuum pump or the like. As a vacuum is thus created in the sealed chamber 10, the tread portion of the tire is drawn into it and the tire is given its proper shape (substantially a U-shape in cross-section).

The shaping of the tire is quickly followed by the lowering of the U-shaped member 19, which, as above explained, operates the link 80, lever 76, and push-rod 73 to depress the rear end portion 72 of the lever 66, reversing the valve 59 so as to admit air to the upper or forward end of the cylinder 53 and to open the lower end thereof to the atmosphere. The piston 52 thereupon moves rearwardly or downwardly and swings the hook member 45 upwardly, causing its lower plate portion 64, which engages the inner or lower end of the curved elongate bag B, to push the same out of the holder and into the shaped tire.

As previously explained, the upper end of the bag is guided forwardly by the lower surface of the forward block 85, so that this leading end of the bag enters the shaped tire and takes an anchorage therein, after which the remaining portion of the bag is moved gradually or progressively (although rapidly) into the tire to completely fill the same.

As the trailing or terminal end portion of the bag moves out of the holder 37, it will engage the upwardly sloping face 87 of the rearward block 86, and, at the same time, the extension 98 of the arm 49 will have acted upon the valve arm 95 to actuate the valve 93 and admit air to the lower or forward end of the rocking cylinder 46, thereby causing the piston rod 91 to move upwardly and rearwardly to actuate the pusher members 100, 101, and 102, which instantly engage the terminal end portion of the bag and push the same into the tire, thus insuring the return of the bag to its original circular shape within the tire.

By releasing the latch 22, the member 19 and top wall 12 can now be swung back to open position to permit the removal of the shaped tire with its contained air bag from the chamber 10, after which the machine is ready to repeat the operating cycle just described.

The machine is of extremely simple but rugged construction and operates very rapidly and efficiently with a minimum amount of labor on the part of the operator.

Figure 6:
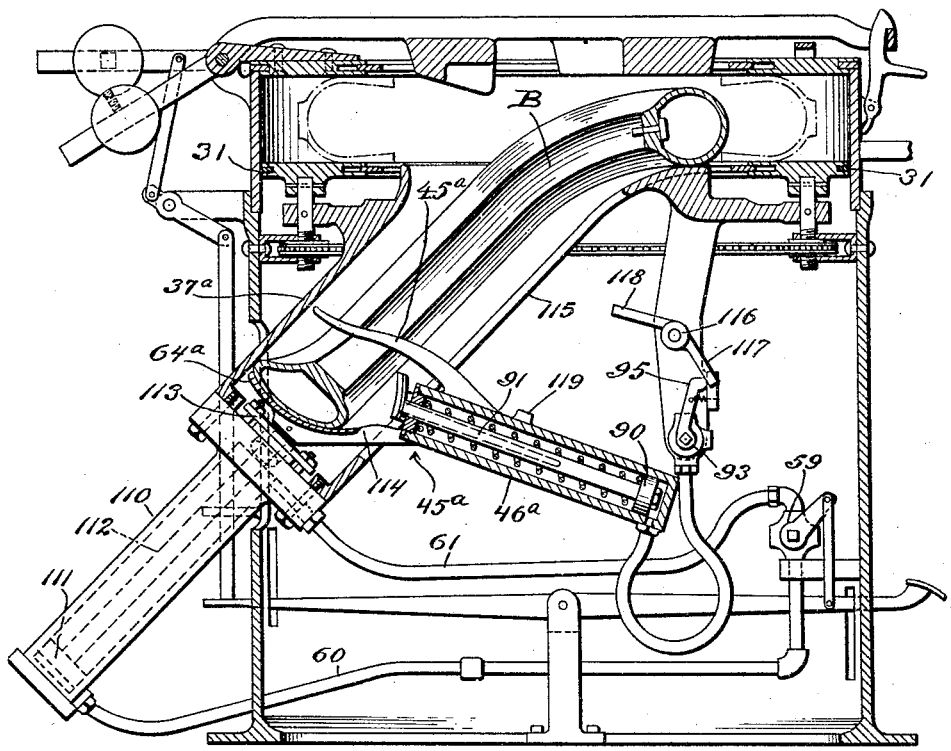
Fig. 6 is a vertical transverse sectional view through a modified form of the invention.

Instead of moving the air-bag hook-member in an arcuate path as above described, it may be moved rectilinearly as shown in Fig. 6. In this modified form of the invention, the holder 37$^a$ is formed with a straight receiving chamber for elongating the bag B, and is inclined downwardly and rearwardly from the center of the vacuum box. Depending from the lower end of the holder 37$^a$, and in axial alinement therewith, is a pressure cylinder 110 whose slidable piston 111 is secured to the lower end of a piston rod 112. This piston rod 112 extends upwardly through a packing gland 113 and carries at its upper end a head 114, which constitutes a support for the lower plate 64$^a$ of the hook member 45$^a$ and for the pusher operating cylinder 46$^a$. Pressure fluid is admitted to and exhausted from the opposite ends of the cylinder 110 through the control valve 59 and flexible hose 60 and 61, as in the first described form.

The piston rod head 114 slides in a slot 115 formed in the inclined front wall 115 of the holder 37$^a$, and the cylinder 46$^a$ extends forwardly therefrom. This cylinder 46$^a$ is fitted with the piston 90 and piston rod 91 for the operation of the pusher plates, as in the first embodiment, and pressure fluid is admitted to the forward end of said cylinder by the valve 93. In this instance, however, the valve 93 is moved to its open position by a rocker or bell-crank lever 116, one arm 117 of which engages the end of the valve arm 95, while its other arm 118 is disposed in the path of movement of a lug 119 positioned on top of the cylinder 46$^a$. Consequently, as the cylinder 46$^a$ approaches the upper limit of its rectilinear movement to push the bag into the tire, the lug 119 will engage the arm 118 and rock the same in a clockwise direction to open the valve 93 for the operation of the pusher plates.

In other respects, the structure and operation of this modification are or may be the same as in the first embodiment. The principal difference between the two embodiments is that, in the first, the air bag is given a curved elongate form and is inserted in that condition into the tire, while in the second, the bag is given a straight elongate form and is inserted into the tire in that condition. In both cases, however, the bag while maintained in elongated form is pushed endwise into the tire, following a curved or arcuate path in the first example and a substantially straight diagonal path in the second example. In the second example, too, the movement of the bag into and out of its holder is effected more directly by the pressure cylinder, due to the direct connection of the hook member to the piston rod.

From the foregoing, it will be evident that a novel apparatus has been provided for shaping tires by the vacuous method and for automatically placing inflatable formers within the tires so shaped. The invention is, of course, susceptible of various modifications in the details of construction and arrangement of parts, and the right is herein reserved to make such changes as fall within the scope of the appended claims without departing from the spirit of the invention.

Having thus described my invention, what I claim is:

1. A machine for shaping tires from pulley-band form comprising an annular chamber open at its inner periphery, means for supporting a tire in pulley-band form adjacent the open inner periphery of said chamber, means for creating a vacuum in said chamber whereby the tread portion of the tire will be drawn into the annular chamber to shape the tire, means disposed at one side of the annular chamber for maintaining an inflatable former in collapsed condition so that it may enter the shaped tire, and means actuated upon the shaping of the tire for moving the inflatable former while in its collapsed condition into the shaped tire and allowing it to resume its normal circular shape therein.

2. A machine for shaping tires from pulley-band form comprising an annular chamber open at its inner periphery, means for supporting a tire in pulley-band form adjacent the open inner periphery of said chamber, means for creating a vacuum in said chamber whereby the tread portion of the tire will be drawn into the annular chamber to shape the tire, means disposed at one side of the annular chamber for distorting an inflatable former from its normal circular shape into a collapsed condition so that it may enter the shaped tire, and means actuated upon the shaping of the tire for moving the inflatable former while in its collapsed condition into the shaped tire and allowing it to resume its normal circular shape therein.

3. A machine of the class described comprising means for shaping a tire from pulley-band form by the vacuous method, manually controlled means for elongating an inflatable former to give it a width less than the bead diameter of the tire, and automatic means for moving the elongated former endwise into the shaped tire.

4. A machine of the class described comprising means for shaping a tire from pulley-band form by the vacuous method, means for elongating an inflatable former to give it a width less than the bead diameter of the tire, and means for moving the elongated former end-first into the shaped tire, said means permitting the entering portion of the inflatable former to resume circular shape progressively within the tire while maintaining its uninserted portion in elongated or contracted condition.

5. A machine for shaping tire from pulley-band form comprising an annular chamber open at its inner periphery, means for supporting a tire in pulley-band form adjacent the open inner periphery of said chamber, means for creating a vacuum in said chamber whereby the tread portion of the tire will be drawn into the annular chamber to shape the tire, means for collapsing an inflatable former from its normal circular shape into elongate form with one end in position to enter the shaped tire, and means actuated upon the shaping of the tire for moving the collapsed inflatable former endwise into the shaped tire with a gradual and progressive movement, whereby the inflatable former is allowed to resume its normal circular shape within the tire as it enters the same.

6. A machine of the class described comprising means for shaping a tire from pulley-band form by the vacuous method, means for deforming an inflatable former from circular to elongated form at one side of said shaping means, and mechanism actuated by fluid pressure for moving the elongated former endwise into the shaped tire.

7. A machine of the class described comprising means for shaping a tire from pulley-band form by the vacuous method, a chamber at one side of said shaping means for deforming an inflatable former from circular to elongated form to give it a width less than the bead diameter of the tire, and mechanism for gradually and progressively moving the elongated former by an endwise movement from said chamber into the shaped tire.

8. A machine of the class described comprising means for shaping a tire from pulley-band form by the vacuous method, a holder for an inflatable former disposed at one side of the tire shaping means, said holder being of a width less than the bead diameter of the tire, whereby to distort said former from circular to elongated shape, and means actuated by pressure fluid for moving said former endwise from said holder into the tire.

9. A machine of the class described comprising means for shaping a tire from pulley-band form by the vacuous method, a holder for an inflatable former disposed at one side of the tire shaping means, said holder being of a width less than the bead diameter of the tire, whereby to distort said former from circular to elongated shape, a hook member movable into and out of said holder and adapted on its inward stroke to draw said former into said holder, and on its outward stroke to push said former into the tire, and mechanism for operating said hook member.

10. A machine for shaping tires from pulley-band form comprising an annular vacuum chamber open at its inner periphery, means for supporting a tire in pulley-band form adjacent said open inner periphery whereby the tread portion of the tire will be drawn into the annular vacuum chamber to shape the tire, and coordinated mechanism for gradually and progressively placing an inflatable former within the tire so shaped.

11. A machine for shaping tires from pulley-band form comprising an annular vacuum chamber open at its inner periphery, means for supporting a tire in pulley-band form adjacent said open inner periphery whereby the tread portion of the tire will be drawn into the annular vacuum chamber to shape the tire, means for elongating an inflatable former at one side of the vacuum chamber to give said former a width less than the bead diameter of the tire, and means for moving the elongated former end-first into the shaped tire while permitting it progressively to resume its original circular shape therein to fill the tire.

12. A machine for shaping tires from pulley-band form comprising an annular vacuum chamber open at its inner periphery, means for supporting a tire in pulley-band form adjacent said open inner periphery whereby the tread portion of the tire will be drawn into the annular vacuum chamber to shape the tire, a holder for an inflatable former disposed at one side of the vacuum chamber and of a width less than the bead diameter of the tire, whereby to distort said former from circular to elongated shape, and means coordinated with the tire shaping means for moving the elongated former endwise from the holder into the shaped tire while permitting it progressively to return to to its original circular shape therein.

13. A machine for shaping tires from pulley-band form comprising an annular vacuum chamber open at its inner periphery, means for supporting a tire in pulley-band form adjacent said open inner periphery whereby the tread portion of the tire will be drawn into the annular vacuum chamber to shape the tire, a holder for an inflatable former disposed at one side of the vacuum chamber and of a width less than the bead diameter of the tire, a hook member movable into and out of said holder and adapted on its inward stroke to move said former into the holder, and on its outward stroke to move the former in its elongated condition from said holder into the shaped tire, and mechanism for actuating said hook member.

14. A machine for shaping tires from pulley-band form comprising an annular vacuum chamber open at its inner periphery, means for supporting a tire in pulley-band form adjacent said open inner periphery whereby the tread portion of the tire will be drawn into the annular vacuum chamber to shape the tire, a holder for an inflatable former disposed at one side of the vacuum chamber and of a width less than the bead diameter of the tire, a hook member movable into and out of said holder and adapted on its inward stroke to draw the inflatable former into said holder, and on its outward stroke to move said former in its elongated condition from the holder into the shaped tire, mechanism operated by fluid pressure for actuating said hook member, means for manually controlling the inward movement of the hook member, and means for automatically controlling the outward movement of the hook member.

15. A machine of the class described comprising a substantially cylindrical casing, a pair of relatively spaced inwardly extending annular walls defining between them and within the casing an annular chamber open at its inner periphery, one of said annular walls being hinged with reference to the cylindrical casing so as to be movable to open and closed positions, means for creating a vacuum within said chamber, means for supporting a tire in pulley-band form adjacent the open inner periphery of the vacuum chamber so that the tread portion of the tire can be drawn into said vacuum chamber to shape the tire, a holder for an inflatable former disposed at one side of said vacuum chamber and of a width less than the bead diameter of the tire, a former-engaging member movable into and out of said holder and adapted on its inward stroke to move the former into said holder to elongate the same, and on its outward stroke to move the elongated former from said holder into the shaped tire, means including a pressure cylinder for actuating said former-engaging member, means for manually controlling the operation of said pressure cylinder to move the former-engaging member inwardly, and means actuated by the closing movement of the hinged annular wall of the vacuum chamber to reverse the operation of said pressure cylinder.

16. A machine according to claim 2, including as an additional element means for engaging the terminal end portion of the inflatable former as it enters the tire and for forcing it outwardly into circular shape within the tire.

17. A machine according to claim 9, characterized by the fact that the hook member therein referred to is in the form of a pressure cylinder containing a piston which carries a pusher adapted to engage the terminal end portion of the inflatable former at the completion of the upward movement of the hook member and positively force said former into circular shape within the tire.

18. A machine according to claim 10, characterized by the fact that one of the annular walls of the vacuum chamber is adjustable axially with reference to the other annular wall for shaping tires of different sizes, and wherein the holder for the inflatable former, and the mechanism for moving said former into and out of said holder, are mounted for movement with said adjustable annular wall.

19. A machine according to claim 4, including as an additional element means for engaging the terminal end portion of the inflatable former as it enters the tire and for forcing it outwardly into circular shape within the tire.

20. A machine according to claim 9, including as an additional element means for engaging the terminal end portion of the inflatable former as it enters the tire and for forcing it outwardly into circular shape within the tire.

21. A machine according to claim 4, including as an additional element means for engaging the terminal end portion of the inflatable former as it enters the tire and for forcing it outwardly into circular shape within the tire, and characterized by the fact that the said terminal engaging means act upon the terminal end portion of the inflatable former in a plurality of directions.

22. A machine according to claim 9, including as an additional element means for engaging the terminal end portion of the inflatable former as it enters the tire and for forcing it outwardly into circular shape within the tire, and characterized by the fact that the said terminal engaging means act upon the terminal end portion of the inflatable former in a plurality of directions.

23. A machine according to claim 9, including as an additional element means for engaging the terminal end portion of the inflatable former as it enters the tire and for forcing it outwardly into circular shape within the tire, and characterized by the fact that the said terminal engaging means are in the form of a plurality of members arranged to engage the terminal end portion of the inflatable former and press it outwardly in diverging lines.

In testimony whereof, this specification has been duly signed by

BARTHOLD DE MATTIA.